March 5, 1957     H. F. BALBONI     2,783,580
FISHHOOK DEVICE
Filed May 15, 1956
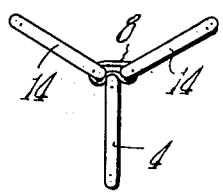
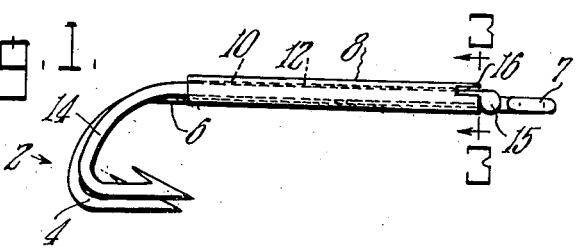
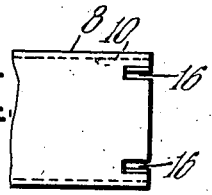  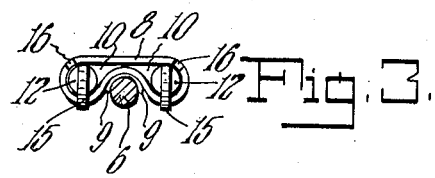
  
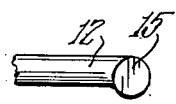  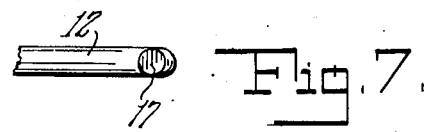
INVENTOR.
Henry F. Balboni.
BY

United States Patent Office 2,783,580
Patented Mar. 5, 1957

2,783,580

FISHHOOK DEVICE

Henry F. Balboni, Greenfield, Mass.

Application May 15, 1956, Serial No. 585,099

1 Claim. (Cl. 43—44.82)

This invention relates to improvements in fishing tackle and is directed more particularly to fish hook devices.

The principal object of the invention is directed to the provision of a fish hook device wherein one or more fish hooks are moveable relative to a fixed hook between a collapsed position wherein the hooked ends of the hooks are in substantially nested or collapsed and superposed position and an extended position wherein the hooked ends of the hooks ares fanned out in operable position.

According to the invention, a main fish hook has a shank secured to a guide means and one or more secondary hooks have shanks which are rotatable and reciprocable in said guide means.

The shanks of the secondary hooks are rotatable in the guide means from a collapsed position of the hooked ends thereof to a desired angular relation of the hooked ends of the hooks. The shanks may be moved forwardly or outwardly in the guide means. Releasable locking means is provided to hold the secondary hooks with the hooked ends in the desired angular relation.

Fish hook devices are common where two or more hooks are fixed together in such a manner that the hooked ends thereof are angularly related or fanned out. Such devices however have objections in that the hooked ends easily and readily become tangled with tackle and present obvious hazards to the user.

According to the novel features of this invention, the hooked ends of the hooks in superposed collapsed relation provide a device which is compact, which occupies small space, and wherein the attendant dangers of the user being hooked are obviated.

Further objects and advantages of my invention will become apparent as the following description proceeds, and the features of novelty which characterize my invention will be pointed out with particularity in the claim annexed to and forming part of this specification.

In the accompanying drawing, I have illustrated a complete example of a physical embodiment of the invention in which the parts are combined and arranged in accordance with one mode which I have devised for the practical application of the principles of the invention. It will be understood that changes and alterations are contemplated and may be made in these exemplifying drawings and mechanical structure, within the scope of the claim, without departing from the principles of the invention.

In the drawings;

Fig. 1 is a side elevational view of a hook device embodying the novel features of the invention;

Fig. 2 is a front elevational view of the hook device shown in Fig. 1 with the secondary hooks in operating position;

Fig. 3 is a sectional view on the line 3—3 of Fig. 1;

Fig. 4 is a plan view of the inner end portion of the guide means of the device;

Figs. 5 and 6 are plan and side elevational views of the inner end of a secondary hook shank; and Figs. 7 and 8 are views similar to Figs. 5 and 6 showing another form of the invention.

In the following description and claim, various details will be identified by specific names for convenience. These names however are intended to be as generic in their application as the art will permit.

Referring now to the drawing more in detail, in which similar characters of reference indicate corresponding parts in the several figures and referring more particularly to the preferred form of my invention selected for illustrative purposes, I have shown a main or primary fish hook which is represented by 2 and which has a hooked end 4 and a shank 6. The shank is secured to elongated guide means 8. The usual eye 7 is provided on the inner end of the hook 2.

The guide means 8 may be provided by forming a tube to have separate guideways 10 as shown in Fig. 3. Otherwise separate tubes for separate guideways may be secured together.

The number of guideways and secondary hooks may vary. In the form of the invention being disclosed, there are two such secondary hooks disclosed.

The main hook will be secured to the guide means in some suitable manner as by welding, brazing, soldering or the like, as at 9.

Secondary hooks have shanks 12 slidable and rotatable in the guideways of the guide means and hooked ends 14 at forward ends thereof.

The hooks are shown in Fig. 1 in collapsed superposed relation of the hooked ends thereof.

Inner ends of the shanks 12 of the secondary hooks are provided with locking portions such as flattened extremities 15 according to the form of the invention being disclosed.

Otherwise, the inner ends of the shanks may be angularly arranged as at 17 as shown in Figs. 7 and 8.

The inner end of the guide means is provided with sockets or recesses 16 to receive the lock means 15 of the secondary hook shanks.

The secondary hooks are turned from the superposed position of their hooked ends as shown in Fig. 1 so that the lock portions 15 or 17 are in alignment with the sockets 16. Then the secondary hooks are moved forwardly to engage the lock portions 15 in said recesses 16. Thereby the secondary hooks are releasably held with their hooked ends in angular relation as in Fig. 2.

The sockets 16 and locking portions 15 of the hooks will be arranged to provide the relation of angularity desired in the fanned out relation of the hook ends.

From the fanned out position of the hooked ends of the hooks shown in Fig. 2, the secondary hooks are moved inwardly to disengage the portions 15 and sockets 16. Then said hooks are turned to bring the hooked ends thereof into superposed relation.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description and all modifications and variations as fall within the meaning and purview and range of equivalency of the appended claim are therefore intended to be embraced therein.

What it is desired to claim and secure by Letters Patent of the United States is:

A fish-hook device comprising in combination, an elongated guide member having a pair of separate and parallel elongated guide bores, a main fish hook having an elongated shank extending along the outer side of the guide member intermediate the guide bores and being fixed to said guide member, said main hook having a forward hook end disposed forwardly of the forward end of the guide member curving outwardly and then returning inwardly in a plane between planes parallel thereto and extending through the longitudinal axes of the guide bores, said main hook having an eye extending outwardly and rearwardly relative to a rear end of said guide member, and a pair of secondary hooks having shanks in said guide bores and forward hook ends extending forwardly of the forward end of the guide member curving outwardly and then returning inwardly, said guide member at the rear end thereof being provided with a forwardly extending recess in the wall of each guide bore and opening rearwardly to receive lock portions of the secondary hooks, said secondary hooks having laterally extending rear lock portions receivable in said recesses, said shanks of the secondary hooks being rotatable in the guide bores between a closed position of the hooks wherein the hook ends of the secondary hooks are closely adjacent opposite sides of the hook end of the main hook and an open position wherein the hook ends of the secondary hooks are disposed in planes angularly disposed relative to the plane of the hook end of the main hook, said shanks of the secondary hooks being slidable in the guide bores whereby in an open position of the hooks the shanks of the secondary hooks may be moved forwardly in said bores to enter the rear lock portions thereof in said recesses thereby to releasably hold the secondary hooks in open position.

References Cited in the file of this patent

UNITED STATES PATENTS

| | | |
|---|---|---|
| 657,387 | Bew | Sept. 4, 1900 |
| 989,392 | Mueller | Apr. 11, 1911 |
| 2,498,612 | Tackett | Feb. 21, 1950 |